(12) United States Patent
Altpeter et al.

(10) Patent No.: US 7,289,940 B2
(45) Date of Patent: Oct. 30, 2007

(54) METHOD AND DEVICE FOR ANALYZING A TECHNICAL SYSTEM, IN ADDITION TO A COMPUTER PROGRAM PRODUCT

(75) Inventors: Reinhold Altpeter, Erlangen (DE); Georg Hoever, München (DE); Ingo Weber, Oviedo, FL (US)

(73) Assignee: Siemens Aktiengesellschaft, Munich (DE)

( * ) Notice: Subject to any disclaimer, the term of this patent is extended or adjusted under 35 U.S.C. 154(b) by 239 days.

(21) Appl. No.: 10/536,760

(22) PCT Filed: Nov. 14, 2003

(86) PCT No.: PCT/EP03/12754

§ 371 (c)(1),
(2), (4) Date: May 26, 2005

(87) PCT Pub. No.: WO2004/059401

PCT Pub. Date: Jul. 15, 2004

(65) Prior Publication Data

US 2006/0167590 A1    Jul. 27, 2006

(30) Foreign Application Priority Data

Nov. 29, 2002  (DE)  ................................ 102 55 959

(51) Int. Cl.
*G06F 17/10* (2006.01)
(52) U.S. Cl. .......................................... 703/2; 703/22
(58) Field of Classification Search .................... 703/2, 703/22; 700/79
See application file for complete search history.

(56) References Cited

U.S. PATENT DOCUMENTS 4,977,531 A    12/1990  Ogata et al.

(Continued)

FOREIGN PATENT DOCUMENTS

DE    198 55 873 A1    6/2000

(Continued)

OTHER PUBLICATIONS

Feldmann et al., A. Deriving Traffic Demands for Operational IP Networks: Mehtodology and Experience, IEEE/ACM Transactions on Networking, vol. 9, No. 3, Jun. 2001, pp. 265-279.*

(Continued)

*Primary Examiner*—Russell Frejd

(57) ABSTRACT

The inventive system is used to design a technical system, which is characterized by condition variables and by diagnostic variables. A measurement field comprising first measured variables is incorporated into the design of the technical system, said first measured variables being measured with a predetermined accuracy. In addition, second measured variables can be measured with a predetermined accuracy. According to the inventive method, sensitivity variables are determined for the first measured variables. To determine said sensitivity variables, the extent to which a modification of the measurement accuracy of the first measured variables influences at least one parameter is calculated and to determine the second sensitivity variables, the extent to which the measurement of the second measured variables influences at least one parameter is calculated. The measurement field is then modified in such a way that the accuracy of the measured variables is altered, the first measured variables are removed from the measurement field and/or the second measured variables are added to the measurement field.

16 Claims, 1 Drawing Sheet

U.S. PATENT DOCUMENTS 5,267,277 A 11/1993 Scarola et al.
5,903,453 A * 5/1999 Stoddard, II .................. 700/79

FOREIGN PATENT DOCUMENTS

| DE | 100 40 620 A1 | 8/2001 |
| EP | 0 770 946 A1 | 5/1997 |
| JP | 6201413 | 7/1994 |
| JP | 2002 328702 | 11/2002 |
| WO | WO 00/65414 | 11/2000 |

OTHER PUBLICATIONS

Verein Deutscher Ingenieure—Richtlinien (Association of German Engineers—Guidelines), "Uncertainties of measurement during acceptance tests on energy-conversion and power plants—Examples, especially retrofit measures", VDI 2048 Part 2, Aug. 2003, pp. 1-59, Germany.

Verein Deutscher Ingenieure—Richtlinien (Association of German Engineers—Guidelines), "Uncertainties of measurement during acceptance tests on energy-conversion and power plants—Fundamentals", VDI 2048 Part 1, Oct. 2000, pp. 1-88, Germany.

Golub, Gene H., Van Loan, Charles F., "Matrix Computations", Third Edition, 1996, pp. vii-ix and 49-50, 257-258, 426-427, The John Hopkins University Press, Baltimore and London.

* cited by examiner

US 7,289,940 B2

METHOD AND DEVICE FOR ANALYZING A TECHNICAL SYSTEM, IN ADDITION TO A COMPUTER PROGRAM PRODUCT

CROSS REFERENCE TO RELATED APPLICATION

This application is the US National Stage of International Application No. PCT/IP2003/012754, filed Nov. 14, 2003 and claims the benefit thereof. The International Application claims the benefits of European Patent application No. 10255959.7 DE filed Nov. 29, 2002, both of the applications are incorporated by reference herein in their entirety.

FIELD OF THE INVENTION

The invention relates to a method and a device for designing a technical system, and a corresponding computer program product.

BACKGROUND OF THE INVENTION

In the description of a technical system, for example a power station, reference is made to various parameters such as, for example, pressures, mass flows, etc. The parameters obey certain physical laws, such as for example those of mass or energy balances, which can be expressed by a system of equations. The solutions of this system of equations are the state variables of the technical system. From these state variables it is possible in turn to calculate diagnostic variables relevant for the operation of the technical system, such as for example the efficiency of a power station. The specific state of a technical system can, furthermore, be sensed by measurements. The measured variables of the measurements could directly reflect the value of a state variable; but it is also possible for measured variables which are derived from the state variables to be measured. For example, it is possible to measure the temperature of a technical system whereas the actual system state variables are the enthalpy and the pressure. In order to determine the state variables from the measured variables, one generally carries out a measurement and looks for the values of the state variables which solve the system of equations, and for which the derived measured variables lie closest to the measured values determined by the measurement (see for example VDI Guideline 2048).

The problem can arise, due to the number of equations in the system of equations being too small, or too small a number of measurement points, that individual state variables or individual diagnostic variables remain indeterminate. In addition, the state variables or diagnostic variables, as applicable, may be subject to great uncertainty, because of measurement errors. It is therefore necessary to decide which measurements would permit the precision of certain state variables to be improved, or would permit any determination at all of certain state variables. For this purpose, it is usual to fall back on the advice of experienced engineers, and the suggestions of these engineers can be checked by simulation programs. However, this requires time-consuming analyses.

SUMMARY OF THE INVENTION

The object of the invention is therefore to specify a method for designing a technical system by which a systematic determination is made of how the measurements of individual measured variables influence the parameters of the technical system.

This object is achieved in accordance with the features of the independent claims. Developments of the invention are defined in the subclaims.

The method in accordance with the invention is for use in designing a technical system which is characterized by parameters, comprising state variables and diagnostic variables which are dependent on the state variables. Here, the term designing means, in particular, the analysis and/or changing of the technical system, in particular the analysis and changing of the measurements made in the technical system. In this situation, the technical system is specified by a system of equations, whereby the state variables are the solution of the system of equations. Incorporated into the design of the technical system is a measurement 'park' which includes first measured variables, whereby these first measured variables are measured in the technical system with a prescribed precision. In addition, second measured variables, which are dependent on the state variables, can be measured in the technical system with a prescribed accuracy.

In the method in accordance with the invention, first sensitivity variables are determined for the first measured variables and/or second sensitivity variables are determined for the second measured variables whereby, for the purpose of defining the first sensitivity variables, a determination is made of the extent to which a change in the accuracy of the measurement of the first measured variables influences at least one selected parameter, and for the purpose of defining the second sensitivity variables, a determination is made of the extent to which the measurement of the second measured variables influences at least one selected parameter. The measurement park is then amended, depending on the first and/or the second sensitivity variables, in such a way that the accuracy of one or more of the first measured variables is changed, and/or one or more of the first measured variables is taken out of the measurement park and/or one or more of the second measured variables is added into the measurement park. This amended measurement park is used for designing the technical system.

In a preferred form of embodiment, the accuracy of a first measured variable is preferably increased, if the first sensitivity variable for this measured variable lies within a predefined value range, and/or a first measured variable is taken out of the measurement park if the first sensitivity variable for this measured variable lies within a predefined value range and/or a second measured variable is added into the measurement park if the second sensitivity variable for this measured variable lies within a predefined value range. It is thus possible in a simple manner, by the choice of different value ranges, to modify the design procedure appropriately for various user-specific requirements.

In a preferred form of embodiment, the technical system is specified by a system of equations $H(x)=(H1(x) \ldots, Hn(x))=0$, where $x=(x1, \ldots xn)$ is a vector which includes as components the state variables $xi$. It is noted at this point that all the indices i, j, k or l used below represent cardinal numbers.

For the purpose of carrying out the method in accordance with the invention in a preferred form of embodiment the following matrices are, in particular, calculated:

- a matrix N which spans the null space of the Jacobian matrix H,
- a matrix W, such that $W^T \cdot W$ is the inverse of the covariance matrix of the first measured variables $y_i = b_i(x)$, where the covariance matrix has as its entries the covariances $\sigma_{ij}^2 = E((y_i - E(y_i))(y_j - E(y_j)))$, where $E(y)$ is the expected value of y;

a matrix M which is the pseudoinverse matrix of A=W·Db·N, where Db is the Jacobian matrix of the first measured variables $y_j=b_j(x)$.

The terms null space, Jacobian matrix and inverse or pseudoinverse matrix, as applicable, have definitions which are familiar from the theory of matrix computations (see for example Gene H. Golub, Charles F. van Load: "Matrix Computations", 3$^{rd}$ Edition, Baltimore, London; The Johns Hopkins University Press; 1996).

In a further preferred form of embodiment of the invention, the first sensitivity variables calculated in the technical system are in each case the ratio of the change in accuracy of a selected parameter to the change in accuracy of a first measured variable, where the selected parameter is a selected state variable, which can be determined via the first measured variables. The method is distinguished in this case by the fact that:

at least one of the selected parameters is a selected state variable, which can be determined via the first measured variables;

one or more of the first sensitivity variables $\Phi_{yjx1}$ represents in each case the ratio of the change in accuracy $\Delta\sigma_{ll}^2/x_1=\Delta E((x_1-E(x_1))^2)/x_1$ of the selected state variable $x_1$ to the change in accuracy $\Delta\sigma_{jj}^2/y_j=\Delta E((y_j-E(y_j))^2)/y_j$ of a first measured variable $y_j$;

the first sensitivity variables are determined from the following formula:

$$\Phi_{y_jx_l} = \frac{\sigma_{jj}^2}{\sigma_{ll}^2} \cdot r_{lj}^2$$

where $r_{lj}$ is the element in the l$^{th}$ line and the j$^{th}$ column of the matrix N·M·W.

In a further form of embodiment, each of the first sensitivity variables represents the ratio of the change in the accuracy of a selected diagnostic variable to the change in the accuracy of a first measured variable, where the selected diagnostic variable can be determined via the first measured variables. In this case, the method is distinguished by the fact that:

at least one of the selected parameters is a selected diagnostic variable, which can be determined via the first measured variables;

a matrix Dd is determined, this being the Jacobian matrix of the diagnostic variables $d_i=d_i(x)$;

one or more of the first sensitivity variables $\Phi_{yj\,dn}$ represents in each case the ratio of the change in accuracy $\Delta\sigma_{nn}^2/d_n=\Delta E((d_n-E(d_n))^2)/d_n$ of the selected diagnostic variable $d_n$ to the change in accuracy $\Delta\sigma_{jj}^2/y_j=\Delta E((y_j-E(y_j))^2)/y_j$ of a first measured variable $y_j$;

the first sensitivity variables are determined by the following formula:

$$\Phi_{y_jd_n} = \frac{\sigma_{jj}^2}{\sigma_{nn}^2} \cdot s_{nj}^2$$

where $s_{nj}$ is the element in the n$^{th}$ line and the j$^{th}$ column of Dd·N·M·W.

In a further preferred form of embodiment, one or more of the second sensitivity variables each represents the variance of a selected state variable when a second measured variable is being added in, where the selected state variable can be determined via the first measured variables. The method is distinguished in this case by the fact that:

at least one of the selected parameters is a selected state variable which can be determined via the first measured variables;

one or more of the second sensitivity variables represents, in each case, the variance $\sigma_{k\to xl}^2$ of the selected state variable $x_l$ when a second measured variable, the value of which is a state variable $x_k$ with the variance $\sigma_k$, is being added to the measurement park;

the second sensitivity variables are determined by the following formula:

$$\sigma_{k\to xl}^2 = m_l^T \cdot m_l - \frac{(m_k^T \cdot m_l)^2}{\sigma_k^2 + m_k^T \cdot m_k}$$

where $m_i$ is the i$^{th}$ column of the matrix M$^T$·N.

In a further form of embodiment of the invention, one or more of the second sensitivity variables represents in each case the variance of a selected diagnostic variable when a second measured variable is being added in, where the selected diagnostic variable can be determined via the first measured variables. Here, the method is distinguished by the fact that:

at least one of the selected parameters is a selected diagnostic variable which can be determined via the first measured variables;

a matrix Dd, which is the Jacobian matrix of the diagnostic variables $d_i=d_i(x)$, is determined;

one or more of the second sensitivity variables represents, in each case, the variance $\sigma_{k\to dn}^2$ of the selected diagnostic variable $d_n$ when a second measured variable, the value of which is a state variable $x_k$ and which has a variance $\sigma_k$ is being added to the measurement park;

the second sensitivity variables are determined by the following formula:

$$\sigma_{k\to dn}^2 = q_n^T \cdot q_n - \frac{(m_k^T \cdot q_n)^2}{\sigma_k^2 + m_k^T \cdot m_k}$$

where $m_i$ is the i$^{th}$ column of the matrix M$^T$·N$^T$, and $q_n$ is the n$^{th}$ column of the matrix and M$^T$·N$^T$·Dd$^T$.

The case can now arise in which the selected parameter of the technical system is a state variable which cannot be determined via the first measured variables. In this case, the first step is to determine a second measured variable, the value of which is a state variable, and which is to be added into the measurement park to enable the selected parameter to be uniquely determined. The method by which this case is taken into account is distinguished by the fact that:

at least one of the selected parameters is a selected state variable which cannot be determined via the first measured variables;

a matrix P, which is the orthogonal projection onto the null space of A, is determined;

a second measured variable is determined, the value of which is a state variable $x_k$, and which is to be added into the measurement park so that the selected state variable can be uniquely determined;

one of the second sensitivity variables represents the variance $\sigma_{k\to xl}^2$ of the selected state variable when the second measured variable $x_k$ which has been determined, and which has the variance $\sigma_k$, is being added to the measurement park;

the second sensitivity variable is determined by the following formula:

$$\sigma^2_{k\to xl} = \sigma^2_k \cdot \frac{\|p\|^2}{\|p_k\|^2} + \left\| m_l - \frac{\|p\|}{\|p_k\|} m_k \right\|^2,$$

with $p=Pn_l$, where $n_l$ is the $l^{th}$ column of the matrix $N^T$, and $m_i$ is the $i^{th}$ column of the matrix $M^T \cdot N^T$ and $p_k$ is the $k^{th}$ column of the matrix $P \cdot N^T$.

The further case can arise in which the selected parameter is a diagnostic variable which cannot be determined via the first measured variable. In this case, the first step is to determine a second measured variable, the value of which is a state variable, and which is to be added into the measurement park. The method by which this case is taken into account is distinguished by the fact that:

- at least one of the selected parameters is a selected diagnostic variable which cannot be determined via the first measured variables;
- a matrix Dd, which is the Jacobian matrix of the diagnostic variables $d_i = d_i(x)$, is determined;
- a matrix P, which is the orthogonal projection onto the null space of A, is determined;
- a second measured variable is determined, the value of which is a state variable $x_k$, and which is to be added into the measurement park so that the selected diagnostic variable can be uniquely determined;
- one of the second sensitivity variables represents the variance $\sigma^2_{k\to dn}$ of the selected diagnostic variable $d_n$ when the second measured variable $x_k$ which has been determined, and which has the variance $\sigma_k$, is being added into the measurement park;
- the second sensitivity variable is determined by the following formula:

$$\sigma^2_{k-dn} = \sigma^2_k \cdot \frac{\|p\|^2}{\|p_k\|^2} + \left\| M^T \cdot c_n - \frac{\|p\|}{\|p_k\|} m_k \right\|^2,$$

with $p=Pc_n$, where $c_n$ is the $n^{th}$ column of the matrix $N^T \cdot Dd^T$, $m_k$ is the $k^{th}$ column of the matrix $M^T \cdot N^T$ and $p_k$ is the $k^{th}$ column of the matrix $P \cdot N^T$.

In the last two mentioned forms of embodiment, the determination of the second measured variable is preferably made by searching the matrix $P \cdot N^T$ for the column for which p is linearly dependent on the vector which the column represents, and the index of this column then gives the second measured variable which is to be added to the measurement park.

In a particularly preferred embodiment of the invention, in those forms of embodiment for which the variance of selected parameters is determined as the second sensitivity variable when second measured variables are being added in, 1% of the value of the second measured variable is taken as the standard deviation for the second measured variables which are to be added in.

It should be remarked at this point that the correctness of all the formulae used above can be demonstrated mathematically.

In addition to the method described above, the invention also relates to a device for carrying put the method in accordance with the invention. Furthermore, the invention covers a computer program product which has a storage medium on which is stored a computer program, which can be executed on a computer and by which the method in accordance with the invention can be performed.

BRIEF DESCRIPTION OF THE DRAWINGS

Exemplary embodiments of the invention are explained and illustrated below by reference to the drawings These show.

DETAILED DESCRIPTION OF THE INVENTION

Figure 1:
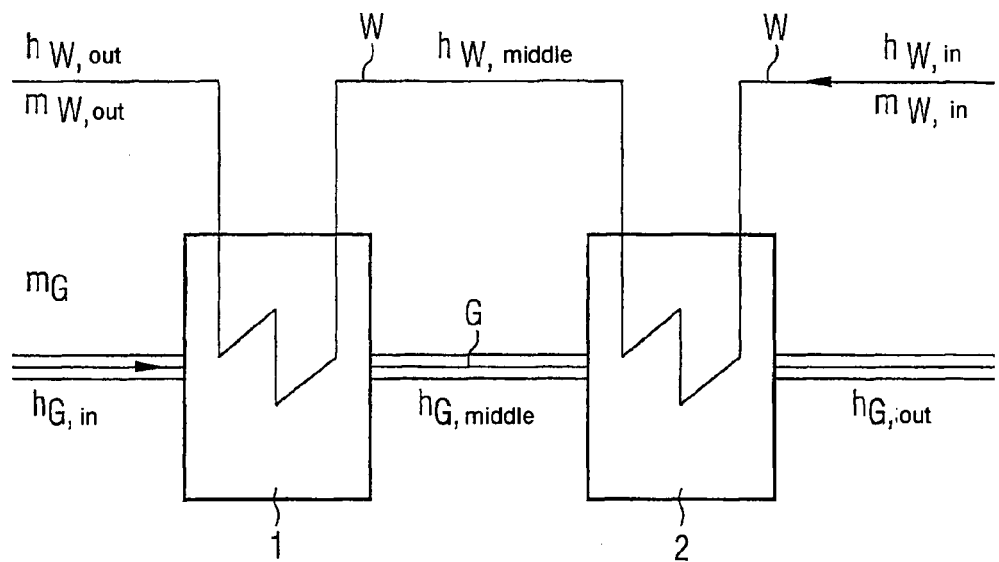
FIG. 1 the schematic structure of a technical system which is analyzed by means of the method in accordance with the invention.

The technical system shown in FIG. 1 relates to a heating system in a power station, with two heating surfaces 1 and 2 connected one after the other, with a gas stream G and a water stream W flowing past these heating surfaces in opposite directions from each other.

The technical system is characterized by the following state variables:

$m_{W,in}$ mass flow of the water when it enters into the heating system;

$m_{W,out}$ mass flow of the water when it leaves the heating system;

$h_{W,in}$ specific enthalpy of the water when it enters into the heating system;

$h_{W,middle}$ specific enthalpy of the water between the two heating surfaces 1 and 2;

$h_{W,out}$ specific enthalpy of the water when it leaves the heating system;

$m_G$ mass flow of the gas in the heating system;

$h_{G,in}$ specific enthalpy of the gas when it enters into the heating system;

$h_{G,middle}$ specific enthalpy of the gas between the two heating surfaces 1 and 2;

$h_{G,out}$ specific enthalpy of the gas when it leaves the heating system.

The state variables are the variables in a system of equations $H(x)=0$, which includes the following physical balance equations:

Mass balance for the water in the heating system:

$$m_{W,in} - m_{W,out} = 0;$$

Enthalpy balance at the first heating surface:

$$m_G \cdot (h_{G,in} - h_{G,middle}) - m_{W,out} \cdot (h_{W,out} - h_{W,middle}) = 0;$$

Enthalpy balance at the second heating surface:

$$m_G \cdot (h_{G,middle} - h_{G,out}) - m_{W,in} \cdot (h_{W,middle} - h_{W,in}) = 0.$$

The following set operating points of the technical system are considered, where the values shown below for the state variables represent a solution to the above system of equations:

| $m_{W,in}$ | $m_{W,out}$ | $h_{W,in}$ | $h_{W,middle}$ | $h_{W,out}$ | $m_G$ | $h_{G,in}$ | $h_{G,middle}$ | $h_{G,out}$ |
|---|---|---|---|---|---|---|---|---|
| 100 | 100 | 200 | 300 | 400 | 50 | 1000 | 800 | 600 |

Apart from the state variables identified above, the technical system is further characterized by a diagnostic value which, in the present case, represents the relative heat transfer of the gas which is flowing through. This heat transfer W can be described by the following formula:

$$W = \frac{h_{G,in} - h_{G,out}}{h_{G,in}}$$

The following first measured variables are measured in the technical system with a standard deviation in each case of 1% relative to the setpoint value concerned:

Enthalpy flow for the water on entry into the heating system:

$m_{W,in} \cdot h_{W,in}$;

Mass flow of the water on entry into the heating system:

$m_{W,in}$

Enthalpy flow for the water on leaving the heating system:

$m_{W,out} \cdot h_{W,out}$;

mass flow of the gas:

$m_G$;

Enthalpy flow of the gas on entry into the heating system:

$m_G \cdot h_{G,in}$

Using the formula quoted above for the relative heat transfer W with the setpoint values gives W=0.4.

Because the standard deviations used are 1%, the measurement of the relative heat transfer leads to a measured value of 0.4 with a standard deviation of 0.0098.

In a first variant of the method in accordance with the invention, the sensitivity variable used for a first measured quantity is in each case the ratio of the change in accuracy of the diagnostic value W to the change in accuracy of the first measured value.

This gives the following values:

Sensitivity variable for the enthalpy flow of the water on entry into the heating system: 0.167.

Sensitivity variable for the mass flow of the water on entry into the heating system: 0.0.

Sensitivity variable for the enthalpy flow of the water on leaving the heating system: 0.667.

Sensitivity variable for the mass flow of the gas: 0.0

Sensitivity variable for the enthalpy flow of the gas on entry into the heating system: 0.167.

It will be seen that the sensitivity variable for the enthalpy flow of the water on leaving the heating system has the greatest value. This means that a change in the accuracy of the measurement of the enthalpy flow of the water on leaving the heating system has the greatest influence on the accuracy of the measurement of the relative heat transfer. It follows that an improvement in the measurement accuracy of the enthalpy flow of the water on leaving the heating system will be most effective in producing an improvement in the accuracy of the diagnostic value. By contrast, the measurements of the mass flows have a sensitivity value of 0, and thus have no affects on the accuracy of the diagnostic value W.

In a further form of embodiment of the method in accordance with the invention, the variances of the relative heat transfer are calculated as the sensitivity variables, on the assumption that in the technical system a state variable is being added in to the first measured variables as a second measured variable with a standard deviation of 1% relative to the setpoint value. Below are given the standard deviations (square roots of the variances) when individual state variables are being added in:

Add in $m_{W,in}$: 0.0098;

Add in $m_{W,out}$: 0.0098;

Add in $h_{W,in}$: 0.0095;

Add in $h_{W,out}$: 0.0086;

Add in $m_G$: 0.0098;

Add in $h_{G,in}$: 0.0095;

Add in $h_{G,out}$: 0.0062;

The addition of $h_{W,middle}$ and $h_{G,middle}$ is not considered because these state variables are not uniquely determined by the measured variables. It can be seen that the introduction of the measurement of $h_{G,out}$ gives the smallest standard deviation for the relative heat transfer. As a consequence, the measurement of $h_{G,out}$ is added into the measurement park for the first measurements.

In a further form of embodiment of the invention, consideration is now given to state variables which are not uniquely determined by the first measured variables of the technical system. In this case, these are the state variables $h_{W,middle}$ and $h_{G,middle}$. A first step is now used to determine the measured variables which must be added in for the state variables $h_{W,middle}$ and $h_{G,middle}$ to be uniquely determined. For this purpose, a calculation is performed in accordance with claim 11.

It turns out that a measurement of $h_{W,middle}$ or $h_{G,middle}$ is in each case sufficient to determine the two state variables $h_{W,middle}$ and $h_{G,middle}$. Making the assumption of a standard deviation of 1% for the measurement of $h_{W,middle}$ or $h_{G,middle}$, as applicable, gives:

in the case of a measurement of $h_{W,middle}$, a standard deviation for $h_{W,middle}$ of 3.0, and a standard deviation for $h_{G,middle}$ of 17.34;

in the case of a measurement of $h_{G,middle}$, a standard deviation for $h_{W,middle}$ of 9.06, and a standard deviation for $h_{G,middle}$ of 8.0.

From this it can be seen that for an exact determination of $h_{W,middle}$ it is preferable to actually measure $h_{W,middle}$, whereas for an exact determination of $h_{G,middle}$ it is preferable to add also $h_{G,middle}$ as a measurement in the measurement park.

The method described above permits a systematic and rapid search for measurement points by which the accuracy of selected state variables or diagnostic variables, as applicable, can be improved. It is thus no longer necessary to fall back on the experience of engineers in order to decide which measured variables should be added into a measurement park, or which measurement accuracies should preferably be improved, as applicable.

Figure 2:
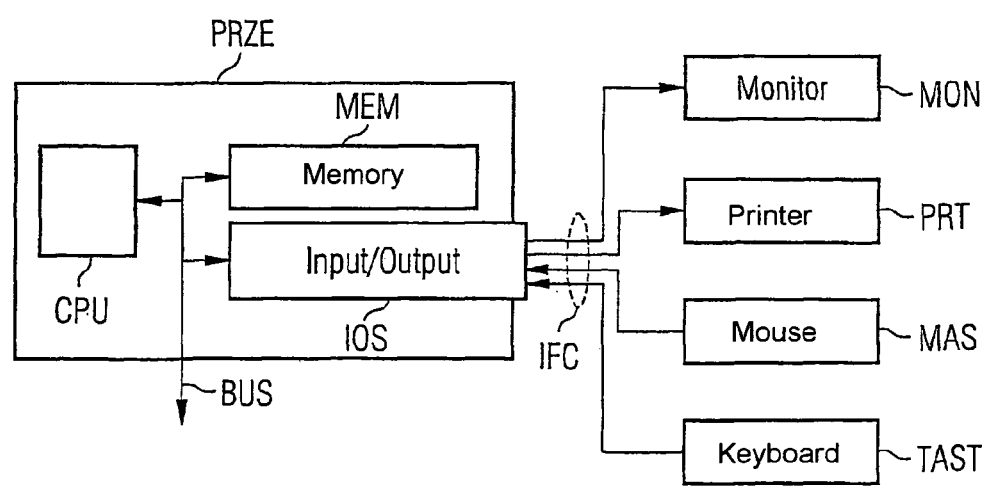
FIG. 2 a processor unit for carrying out the method in accordance with the invention.

FIG. 2 shows a processor unit PRZE for performing the method in accordance with the invention. The processor unit PRZE incorporates a processor CPU, a memory MEM, and an input/output interface IOS, which is used in various ways via an interface IFC: an output is shown visually on a monitor MON via a graphic interface, and/or is output on a printer. Inputs are made via a mouse MAS or a keyboard TAST. The processor unit PRZE also provides a data bus BUS, which establishes the link between a memory MEM, the processor CPU and the input/output interface IOS. Further, additional components can be connected to the data bus, for example additional memory, data storage (hard disk) or scanners.

The invention claimed is:

1. A method for designing a technical system, including state variables and diagnostic variables that depend on the state variables, comprising:
specifying the technical system by a system of equations and with the state variables being the solutions of the system of equations;
analyzing a measurement park, incorporating a first measured variable and the first measured variable is measured in the technical system with a prescribed accuracy and depend on the state variables;
measuring a second measured variable, which depends on the state variables, in the technical system with a predetermined accuracy;
determining sensitivity variables for the first measured variable and/or the second sensitivity variable for the second measured variable;
determining the magnitude of the influence which a change in the accuracy of measurement of the first measured variable has at least one selected parameter to determine the first sensitivity variable, and to determine the second sensitivity variable, a determination is made of the magnitude of the influence which the measurement of the second measured variable has at least one selected parameter;
changing the measurement park to produce an amended measurement park, the changing depending on the first and/or second sensitivity variable, in such a way that the accuracy of the first measured variable is changed and/or the first measured variable is taken out of the measurement park and/or the second measured variable is added into the measurement park; and
outputting a signal indicative of the amended measurement park for performing at least one of the following to design the technical system: selecting which respective state variables and/or diagnostic variables of the technical system to measure, and determining respective measurement accuracies for state variables and/or diagnostic variables of the technical system.

2. The method in accordance with claim 1, wherein the accuracy of the first measured variable is increased if the first sensitivity variable for this measured variable lies within a predefined value range and/or the first measured variable is taken out of the measurement park if the first sensitivity variable for this measured variable lies within a predefined value range and/or the second measured variable is added into the measurement park if the second sensitivity variable for this measured variable lies within a predefined value range.

3. The method in accordance with claim 2, wherein the technical system is described by a system of equations $H(x)=(H_1(x), \ldots, H_m(x))=0$, where $x=(x_1, \ldots, x_n)$ is a vector in which the components are the state variables $x_i$.

4. The method in accordance with claim 3, wherein the following matrices are calculated: a matrix N, which spans the null space of the Jacobian matrix of H, a matrix W, such that $W^T \cdot W$ is the inverse of the covariance matrix of the first measured variables $y_i=b_i(x)$, where the entries in the covariance matrix are the covariances $\sigma_{ij}^2=E((y_i-E(y_i))(y_j-E(y_j)))$, where $E(y)$ is the expected value of y, a matrix M which is the pseudoinverse matrix of $A=W \cdot Db \cdot N$, where Db is the Jacobian matrix of the first measured variables $y_i=b_i(x)$.

5. The method in accordance with claim 4, wherein at least one of the selected parameters is a selected state variable which can be determined via the first measured variables, one or more of the first sensitivity variables $\Phi_{yjxl}$ represents in each case the ratio of the change in accuracy $\Delta\sigma_{ll}^2/x_l=\Delta E((x_l-E(x_l))^2)/x_l$ of the selected state variable $x_l$ to the change in accuracy $\Delta\sigma_{jj}^2/y_j=\Delta E((y_j-E(y_j))^2)/y_j$ of a first measured variable $y_j$, the first sensitivity variables are determined from the following formula:

$$\Phi_{y_jx_l} = \frac{\sigma_{jj}^2}{\sigma_{ll}^2} \cdot r_{lj}^2$$

where $r_{lj}$ is the element in the $l^{th}$ line and the $j^{th}$ column of the matrix $N \cdot M \cdot W$.

6. The method in accordance with claim 5, wherein one of the selected parameters is a selected diagnostic variable which can be determined via the first measured variables, a matrix Dd is determined, this being the Jacobian matrix of the diagnostic variables $d_i=d_i(x)$, one or more of the first sensitivity variables $\Phi_{yj\,dn}$ represents in each case the ratio of the change in accuracy $\Delta\sigma_{nn}^2/d_n=\Delta E((d_n-E(d_n))^2)/d_n$ of the selected diagnostic variable $d_n$ to the change in accuracy $\Delta\sigma_{jj}^2/y_j=\Delta E((y_j-E(y_j-E(y_j))^2)/y_j$ of a first measured variable $y_j$, the first sensitivity variables are determined by the following formula:

$$\Phi_{y_jd_n} = \frac{\sigma_{jj}^2}{\sigma_{nn}^2} \cdot s_{nj}^2$$

where $s_{nj}$ is the element in the $n^{th}$ line and the $j^{th}$ column of $Dd \cdot N \cdot M \cdot W$.

7. The method in accordance with claim 6, wherein at least one of the selected parameters is a selected state variable which can be determined via the first measured variables, one or more of the second sensitivity variables represents, in each case, the variance $\sigma_{k \to xl}^2$ of the selected state variable $x_l$ when a second measured variable, the value of which is a state variable $x_k$ with the variance $\sigma_k$, is being added to the measurement park, the second sensitivity variables are determined by the following formula:

$$\sigma_{k \to xl}^2 = m_l^T \cdot m_l - \frac{(m_k^T \cdot m_l)^2}{\sigma_k^2 + m_k^T \cdot m_k},$$

where $m_i$ is the $i^{th}$ column of the matrix $M^T \cdot N$.

8. The method in accordance with claim 7, wherein at least one of the selected parameters is a selected diagnostic variable which can be determined via the first measured variables, a matrix Dd, which is the Jacobian matrix of the diagnostic variables $d_i=d_i(x)$, is determined, one or more of the second sensitivity variables represents, in each case, the variance $\sigma_{k \to dn}^2$ of the selected diagnostic variable $d_n$ when a second measured variable, the value of which is a state variable $x_k$ which has a variance $\sigma_k$, is being added to the measurement park, the second sensitivity variables are determined by the following formula:

$$\sigma_{k \to dn}^2 = q_n^T \cdot q_n - \frac{(m_k^T \cdot q_n)^2}{\sigma_k^2 + m_k^T \cdot m_k}$$

where $m_i$ is the $i^{th}$ column of the matrix $M^T \cdot N^T$, and $q_n$ is the $n^{th}$ column of the matrix and $M^T \cdot N^T \cdot Dd^T$.

9. The method in accordance claim 8, wherein at least one of the selected parameters is a selected state variable which cannot be determined via the first measured variables, a matrix P, which is the orthogonal projection onto the null space of A, is determined, a second measured variable is determined, the value of which is a state variable $x_k$, and which is to be added into the measurement park so that the selected state variable can be uniquely determined, one of the second sensitivity variables represents the variance $\sigma^{k \to xi2}$ of the selected state variable when the second measured variable $x_k$ which has been determined, and which has the variance $\sigma_k$, is being added to the measurement park, the second sensitivity variable is determined by the following formula:

$$\sigma^2_{k \to x1} = \sigma^2_k \cdot \frac{\|p\|^2}{\|p_k\|^2} + \left\| m_l - \frac{\|p\|}{\|p_k\|} m_k \right\|^2,$$

with $p = Pn_l$, where $n_l$ is the $l^{th}$ column of the matrix $N^T$, and $m_i$ is the $i^{th}$ column of the matrix $M^T \cdot N^T$ and $p_k$ is the $k^{th}$ column of the matrix $P \cdot N^T$.

10. The method in accordance with claim 9, wherein at least one of the selected parameters is a selected diagnostic variable which cannot be determined via the first measured variables, a matrix Dd, which is the Jacobian matrix of the diagnostic variables $d_i = d_i(x)$, is determined, a matrix P, which is the orthogonal projection onto the null space of A, is determined, a second measured variable is determined, the value of which is a state variable $x_k$, and which is to be added into the measurement park so that the selected state variable can be uniquely determined, one of the second sensitivity variables represents the variance $\sigma_{k \to dn}^2$ of the selected diagnostic variable $d_n$ when the second measured variable $x_k$ which has been determined, and which has the variance $\sigma_k$, is being added into the measurement park, the second sensitivity variable is determined by the following formula:

$$\sigma^2_{k \to dn} = \sigma^2_k \cdot \frac{\|p\|^2}{\|p_k\|^2} + \left\| M^T \cdot c_n - \frac{\|p\|}{\|p_k\|} m_k \right\|^2,$$

with $p = Pc_n$, where $c_n$ is the $n^{th}$ column of the matrix $N^T \cdot Dd^T$, $m_k$ is the $k^{th}$ column of the matrix $M^T \cdot N^T$ and $p_k$ is the $k^{th}$ column of the matrix $P \cdot N^T$.

11. The method in accordance with claim 10, wherein the matrix $P \cdot N^T$ is searched for the column such that p is a linear function of this column, where the index k of this column specifies that the second measurement value $x_k$ is to be added into the measurement park so that the selected parameter can be uniquely determined.

12. The method in accordance with claim 11, wherein the standard deviation $\sigma_k$ of the second measured variable is 1% of the value of the second measured variable.

13. A device for analyzing a technical system, comprising:
a storage medium;
a computer program stored on the storage medium, wherein the computer program comprises computer-readable code comprising;
a software module for specifying the technical system by a system of equations and a plurality of state variables being the solutions of the system of equations;
a software module for analyzing a measurement park, incorporating a first measured variable and the first measured variable is measured in the technical system with a prescribed accuracy and depends on the state variables;
a software module for measuring a second measured variable, which depends on the state variables, in the technical system with a predetermined accuracy;
a software module for determining sensitivity variables for the first measured variable and/or the second sensitivity variable for the second measured variable;
determining the magnitude of the influence which a change in the accuracy of measurement of the first measured variable has at least one selected parameter to determine the first sensitivity variable, and to determine the second sensitivity variable, a determination is made of the magnitude of the influence which the measurement of the second measured variable has at least one selected parameter;
a software module for changing the measurement park to produce an amended measurement park, said changing depending on the first and/or second sensitivity variable, in such a way that the accuracy of the first measured variable is changed and/or the first measured variable is taken out of the measurement park and/or the second measured variable is added into the measurement park; and
a software module for outputting a signal indicative of the amended measurement park for performing at least one of the following to design the technical system; selecting which respective state variables and/or diagnostic variables of the technical system to measure, and determining respective measurement accuracies for state variables and/or diagnostic variables of the technical system.

14. The device in accordance with claim 13, wherein the accuracy of the first measured variable is increased if the first sensitivity variable for this measured variable lies within a predefined value range and/or the first measured variable is taken out of the measurement park if the first sensitivity variable for this measured variable lies within a predefined value range and/or the second measured variable is added into the measurement park if the second sensitivity variable for this measured variable lies within a predefined value range.

15. The device in accordance with claim 14, wherein the technical system is described by a system of equations $H(x) = (H_1(x), \ldots, H_m(x)) = 0$, where $x = (x_1, \ldots, x_n)$ is a vector in which the components are the state variables $x_i$.

16. The device in accordance with claim 15, wherein the following matrices are calculated: a matrix N, which spans the null space of the Jacobian matrix of H, a matrix W, such that $W^T \cdot W$ is the inverse of the covariance matrix of the first measured variables $y_i = b_i(x)$, where the entries in the covariance matrix are the covariances $\sigma_{ij}^2 = E((y_i - E(y_i))(y_j - E(y_j)))$, where $E(y)$ is the expected value of y, a matrix M which is the pseudoinverse matrix of $A = W \cdot Db \cdot N$, where Db is the Jacobian matrix of the first measured variables $y_i = b_i(x)$.

* * * * *